(12) United States Patent
Vollkommer et al.

(10) Patent No.: US 6,454,451 B1
(45) Date of Patent: Sep. 24, 2002

(54) FLAT LIGHTING DEVICE HAVING AN APERTURE LAMP

(75) Inventors: Frank Vollkommer, Buchendorf; Lothar Hitzschke, Munich, both of (DE)

(73) Assignee: Patent-Treuhand-Gesellschaft fuer Elektrische Gluehlampen, Munich (DE)

( * ) Notice: Subject to any disclaimer, the term of this patent is extended or adjusted under 35 U.S.C. 154(b) by 0 days.

(21) Appl. No.: 09/555,043

(22) PCT Filed: Sep. 11, 1999

(86) PCT No.: PCT/DE99/02881
§ 371 (c)(1),
(2), (4) Date: May 24, 2000

(87) PCT Pub. No.: WO00/19144
PCT Pub. Date: Apr. 6, 2000

(30) Foreign Application Priority Data

Sep. 30, 1998 (DE) .......................... 198 44 921
Feb. 9, 1999 (DE) .......................... 199 05 219

(51) Int. Cl.7 .............................................. G09F 13/18
(52) U.S. Cl. ...................... 362/559; 362/260; 313/117; 313/635
(58) Field of Search ................................ 362/217, 260, 362/263, 290, 291, 23, 26, 559, 551, 583, 31; 313/110, 117, 113, 567, 635, 488

(56) References Cited

U.S. PATENT DOCUMENTS 5,055,978 A * 10/1991 Rogoff .......................... 362/31
5,645,337 A * 7/1997 Gleckman ..................... 362/29

* cited by examiner

Primary Examiner—Sandra O'Shea
Assistant Examiner—Ismael Negron
(74) Attorney, Agent, or Firm—Robert F. Clark

(57) ABSTRACT

A flat lighting device (8; 32) having an aperture fluorescent lamp (33), an optical system (10; 34) and an optical conductor plate (11; 35) is provided. The optical system (10: 34) specifically influences the light distribution of the light to be coupled into the optical conductor plate in such a way that seen in a cross-sectional plane of the tubular discharge vessel of the lamp, the light distribution has at least one maximum at an angular spacing $\beta$, measured from the optical axis (A), the angular spacing $\beta$ fulfilling the following relationship:

$$|\beta| \geq \arctan\left(\frac{d}{L}\right)$$

L being the longitudinal extent of the optical conductor plate in the direction of the optical axis (A) and d being its thickness.

20 Claims, 7 Drawing Sheets though the underside, a diffuse reflection at the scattering centres applied thereto, and is relayed to the front side, that is to say it is outcoupled. However, the portion which strikes the narrow surface opposite the light entrance surface is lost irretrievably. This loss is drastically reduced in the case of the solution according to the invention presented below.

FLAT LIGHTING DEVICE HAVING AN APERTURE LAMP

TECHNICAL FIELD

The invention relates to a flat lighting device having a discharge lamp with an aperture, an optical system and an optical conductor plate.

The discharge lamp, optical system and optical conductor plate are coordinated in this case with one another geometrically and arranged relative to one another such that the light from the lamp can be coupled into the optical conductor plate through at least one narrow side ("edge") thereof (so-called "edge-light technique"). By means of reflection at scattering centres which are applied, for example, to the underside of the optical conductor plate, this light passes through to the outside over the entire front side of the optical conductor plate, and thus acts as a flat light source extended in accordance with the dimensions of the optical conductor plate.

Moreover, the discharge lamp used is, in particular, a fluorescent lamp with a tubular discharge vessel which is sealed at both ends and whose wall is coated at least partially with a fluorescent material. Moreover, in order to increase the luminous density this lamp is provided along its longitudinal axis on the inside or outside of the discharge vessel with a reflector of visible light which is recessed along the longitudinal axis over a defined region. This creates an aperture through which the light from the lamp reaches the outside (aperture lamp). The discharge vessel can be tubular, or also angular, for example L-shaped or U-shaped. In the last-mentioned case, the light from the lamp is coupled into the optical conductor plate via two or three of the edges thereof.

Such lighting devices serve, for example, for backlighting displays, in particular liquid crystal displays (LCDs) but also large-area advertising panels. Liquid crystal displays are used multifariously, for example in control rooms, aircraft cockpits and, increasingly, also motor vehicles, in consumer electronics and communications electronics, and as display screens for personal computers (PCs).

PRIOR ART

U.S. Pat. No. 5,055,978 discloses a flat lighting device having a tubular aperture fluorescent lamp and an optical conductor plate. The diameter of the circular cross section of the aperture lamp is greater than the thickness of the optical conductor plate. However, the width of the aperture is selected to be smaller than the thickness of the optical conductor plate. Arranged between the aperture and the optical conductor plate is a trapezoidal perspex wedge which is intended to reduce the losses when the lamp light is coupled into the optical conductor plate. In this case, the device is designed in such a way that the light can be guided with the aid of total reflection inside the perspex wedge from the lamp to the optical conductor plate.

The width of the aperture, which is relatively slight by comparison with the lamp diameter, is disadvantageous, since the light yield and the luminous flux of the lamp drops distinctly with reduction in the ratio b/D between the aperture width b and lamp diameter D. In the cited prior art, the aperture angle produced by the width of the aperture and referred to the midpoint of the circular lamp vessel cross section is smaller than 45°, but in any case distinctly smaller than 90°.

SUMMARY OF THE INVENTION

It is the object of the present invention to provide an improved flat lighting device. An important aspect in this case is to improve the overall efficiency of the device.

It is helpful to define an optical axis for the purpose of better understanding of the following explanations with reference to the basic idea of the invention. Said axis lies in the plane of the front side of the optical conductor plate and, in addition, forms a right angle with the lamp longitudinal axis.

The light coming from the lamp is thus coupled into the optical conductor plate substantially in the direction of the optical axis and subsequently outcoupled from the optical conductor plate through the front side as useful light.

The starting point of the following considerations is the realization that the requirement for total reflection inside the optical conductor plate must be met for as large as possible a portion of the radiation coupled into the optical conductor plate. The point is that only this portion, together with that portion which in any case strikes directly on the underside of the optical conductor plate after entering the latter can be reflected at the diffuse reflector, arranged on the underside of the optical conductor plate for example, and through the front side, and be relayed beneficially. The remainder is lost for the actual application.

Investigations have now shown that the emission characteristic of aperture lamps without additional measures is very similar to a Lambert distribution, that is to say the angle-dependent intensity distribution of a small subarea of the luminous area of the aperture follows the relationship $I(\alpha)=I_0 \cdot \cos \alpha$, $\alpha$ denoting the angle between the surface normal and the relevant light beam with the intensity $I(\alpha)$ and $I_0$ denoting the maximum intensity in the direction of the surface normal of the subarea (a=0). In other words, aperture lamps emit the majority of their luminous flux in the forward direction.

This leads, undesirably, chiefly in the case of the use of lamps whose aperture width is comparable to the thickness of the optical conductor plate to the fact that a significant proportion of the radiation experiences no total reflection inside the optical conductor plate, but essentially strikes the narrow surface, opposite the light entrance surface, of the optical conductor plate and is lost at some stage. The curvature of the surface of the discharge tube plays only a subordinate role here, because of the correspondingly large diameter of the discharge vessel, that is to say the surface normals of all the surface elements of the aperture are orientated approximately parallel to one another and to the optical axis.

On the other hand, as already explained at the beginning, the aim is to select the width b of the aperture to be as large as possible. For this reason, the ratio b/D between the aperture width b and lamp diameter D is preferably selected, at least in the case of tubular lamps with a circular cross-sectional surface, so as to achieve an effective aperture angle $\theta$ of greater than 45°, particularly preferably of the order of magnitude of approximately 90°, for example approximately 80° or more.

Moreover—for reasons of the targeted high luminous densities on the front side of the optical conductor plate—the ranges of b/d>0.6, 0.8 and 1 are preferred for the ratio of the aperture width b to the thickness d of the optical conductor plate.

It has been shown in this regard that the outside diameter D (in the case of a circular cross section) of the discharge vessel is typically equal to or greater than the 0.8-fold thickness d of the optical conductor plate.

The light loss mentioned further above can be distinctly reduced by specifically varying the distribution of the light which is coupled into the optical conductor plate. According to the invention, for this purpose the proportion of the radiation which otherwise passes directly through the optical conductor plate and is lost for the useful radiation is redistributed onto the proportion which is totally reflected inside the optical conductor plate.

This procedure additionally renders it possible for the first time in the case of the edge-light technique actually to profit from the luminous flux which increases with the lamp diameter D in the case of lamps with electrodes arranged on the wall of the discharge tube parallel to the tube longitudinal axis. These lamps are operated by means of dielectrically impeded discharge, for example by arranging two strip-shaped electrodes diametrically on the discharge vessel wall. To be specific, enlarging the diameter of such lamps also increases the striking distance, the power which can be coupled in and, consequently, the luminous flux. For further details on the notion of the "dielectrically impeded discharge" and, in particular, on the pulsed dielectrically impeded discharge, which is recognized as particularly efficient, reference may be made to WO 94/23442 which was already cited. Moreover, refer-ence is made to WO 98/49712 of the same applicant, in which the possibility of raising the luminous density of the lamp aperture in conjunction with the use of more than two electrodes is disclosed.

According to the invention, the flat lighting device has a tubular aperture lamp. Moreover, the lighting device has an optical system which specifically influences the light distribution of the light which is to be coupled, or has been coupled into the optical conductor plate in such a way that—seen in a plane of section perpendicular to the lamp longitudinal axis—this light distribution has at least one maximum at the angular spacing β, measured relative to the optical axis, and satisfies the following relationship:

$$|\beta| \geq \arctan\left(\frac{d}{L}\right), \quad (1)$$

L being the longitudinal extent, that is to say the extent in the direction of the optical axis of the optical conductor plate, and d being the thickness of the optical conductor plate.

The diagrammatic sectional illustration in FIG. 1 illustrates this concept with the aid of a light distribution curve 1 with two maxima 2, 3, which form the angles $\beta_1$ and $\beta_2$, respectively, with the optical axis A. Starting from an origin 0 on the optical axis, it is possible to envisage imaginary arrows which end in each case on the light distribution curve 1. The length of an arrow is then a measure of the light intensity in the direction of the respective arrow. The two longest arrows 2', 3' correspond to the two maxima 2, 3 named, and therefore enclose the angles $\beta_1$ and $\beta_2$, respectively, with the optical axis. The absolute values of the two angles $\beta_1$ and $\beta_2$ can be equal, or else different. The light is coupled with this distribution into the light entrance surface 4 of the optical conductor plate 5.

In contradistinction, without suitable optical measures the prior art exhibits a light distribution curve 6 with only one maximum 7 which is orientated colinearly (β=0) with reference to the optical axis A. Consequently, a majority of the radiation passes directly, that is to say without total reflection, through the optical conductor plate 5.

According to the invention, the optical system can also be an integral component of the optical conductor plate. For example, the light entrance surface of the optical conductor plate can be provided with a V-shaped, parabolic or similar cutout, with the result that in each case a major part of the incident light beams is refracted upon entry into the plate in the direction of its front side or base side. Reference may be made to the exemplary embodiments for further details on this.

Furthermore, the optical system can also be a component of the lamp, for example in that the aperture is split into two in such a way that a web which reflects the visible radiation and separates the two partial apertures from one another is orientated parallel to and centrally relative to the light entrance surface of the optical conductor plate. This produces in a simple way two luminous density maxima which form the required angle to the optical axis, given suitable dimensioning. It is advantageous in this variant that the tubular discharge vessel is shaped as a drop in cross section, for example by means of deep drawing. The two partial apertures are then arranged in the region of the tight curvature of the tube profile, whereas the electrodes are arranged in the region of the wide curvature. Consequently, it is possible, on the one hand, to implement in each case for the intensity maxima of the two partial apertures a wide angle β corresponding to the relationship (1) such as would otherwise be possible in tubes of circular cross section only in the case of relatively small diameters. On the other hand, it is, nevertheless, possible as desired to achieve a large striking distance W corresponding to a relatively large diameter in the case of a tube of circular cross-sectional area. Reference is likewise made to the exemplary embodiments for further details on this.

It is of no significance for the advantageous operation of the invention whether the optical system is arranged as a transmissive element on the side of the optical conductor plate facing the lamp, or as a reflective element on the side of the optical conductor plate diverted from the lamp. More details on this are likewise set forth in the exemplary embodiments.

Moreover, Fresnel films or prismatic films and holographic diffusers which produce distributions with two or more lobe-type maxima (Tedesco et al.: Holographic Diffusers for LCD Backlights and Projection Screens; SID 93DIGEST, pages 29–32) are suitable for the optical system of cylinder lenses and/or directional turning films (for example directional turning films from POC Physical Optics Corporation, or image directing films from 3M).

Finally, the system can be optimized on the basis of the principle, explained at the beginning, using the so-called ray-tracing method. The aim of the optimization is to maximize the backlighting properties of the lighting device, that is to say, in the final analysis, to maximize the level and uniformity of the luminous density on the front side of the optical conductor plate.

An option is the provision of an optical reflector which envelopes the space between the aperture of the lamp and the light entrance surface of the optical conductor plate.

In a particularly advantageous design of the flat lighting device, provision is made of a discharge lamp with an aperture which is suitable for operating by means of dielectrically impeded discharge.

For the purpose of the greatest possible increase in the luminous density of the front side of the optical conductor plate, the diameter D of the lamp is selected to be appropriately large within the scope of the structural possibilities (mounting depth), preferably equal to or greater than the thickness d of the optical conductor plate.

In an preferred design, the tubular lamp has two strip-shaped electrodes which are arranged on the inner wall or outer wall or the discharge vessel of the lamp parallel to the tube longitudinal axis and diametrically relative to one another. In this way, the large lamp diameter is specifically utilized for the corresponding maximum possible striking distance W of the discharge. Specifically, with increasing striking distance there is also an increase in the operating voltage for the dielectrically impeded discharge, and consequently in the active electric power which can be coupled in. Finally, with the aid of the pulsed mode of operation in accordance with WO 94/23442 this leads, as desired, to the abovementioned increase in the luminous flux of the lamp.

As has already been explained in detail further above there is—given the preferred mode of operation of the lamp in accordance with WO 94/23442—an increase both in the power which can be coupled in and in the efficiency, and thus in the luminous flux, of the lamp as the lamp diameter increases. Consequently, it is necessary—to the extent that the aperture lamp and the optical conductor plate are arranged in a common plane, and the thickness of the optical conductor plate corresponds approximately to the aperture width of the lamp—to accept for a high luminous density on the front side a relatively large lamp diameter, and thus also a correspondingly thick optical conductor plate.

However, thick optical conductor plates of suitable optical quality are relatively expensive. Moreover, the higher weight is disadvantageous, in particular for the purpose of mobile use.

In order to address this problem, in one variant of the device according to the invention the aperture lamp is arranged laterally above or below the optical conductor plate. One or more optical coupling elements which are adapted specifically for light coupling are provided as optical system for redistributing the light distribution.

The first side, facing the aperture of the lamp, of the at least one coupling element is wider than the second side, facing the optical conductor plate. The width of the first side of the coupling element is typically at least as large as the width of the lamp aperture, in order as far as possible to be able to absorb the entire luminous flux passing through the lamp aperture, that is to say keep coupling losses small. The width of the second side of the coupling element preferably corresponds to the thickness of the optical conductor plate, in order, in turn, to keep the coupling losses small when light enters the plate.

In this way, it is possible according to the invention to combine an aperture lamp of large diameter, that is to say high luminous flux, and a relatively thin optical conductor plate to form a cost effective lighting device of high luminous density.

Moreover, the coupling element is designed, or it cooperates with the aperture lamp, in such a way that the light distribution explained in the above relationship (1) results according to the invention for the light which is to be, or has been, coupled into the optical conductor plate. For example, the lamp is integrated, for example embedded, at least partially into the at least one coupling element. In this regard, the aperture lamp itself can also be considered as a component of the optical system.

DESCRIPTION OF THE DRAWINGS

The aim below is to explain the invention in more detail with the aid of a plurality of exemplary embodiments. In the drawings.

DETAILED DESCRIPTION OF THE INVENTION

Figure 1:
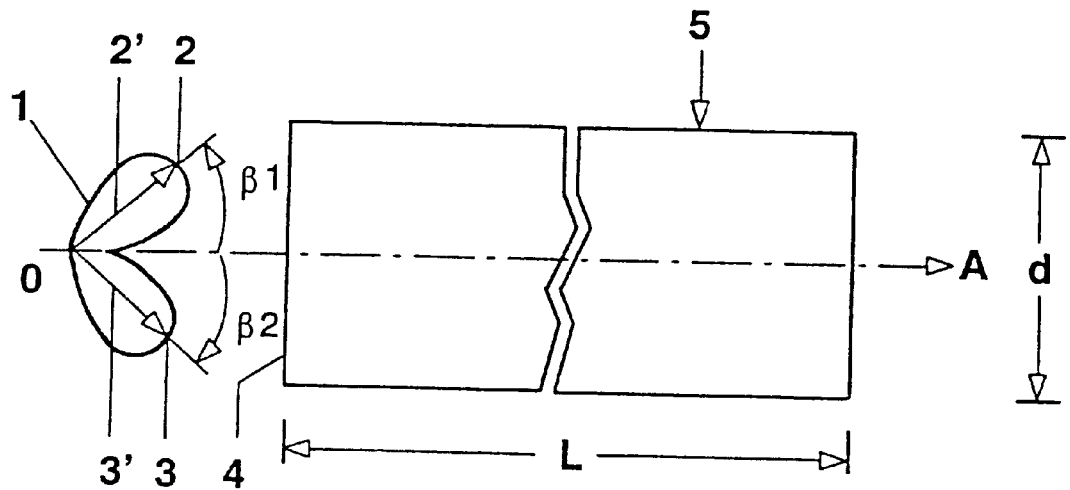
FIG. 1 shows a diagrammatic sectional illustration for explaining the principle of the invention with the aid of a light distribution having two maxima.
Figure 2:
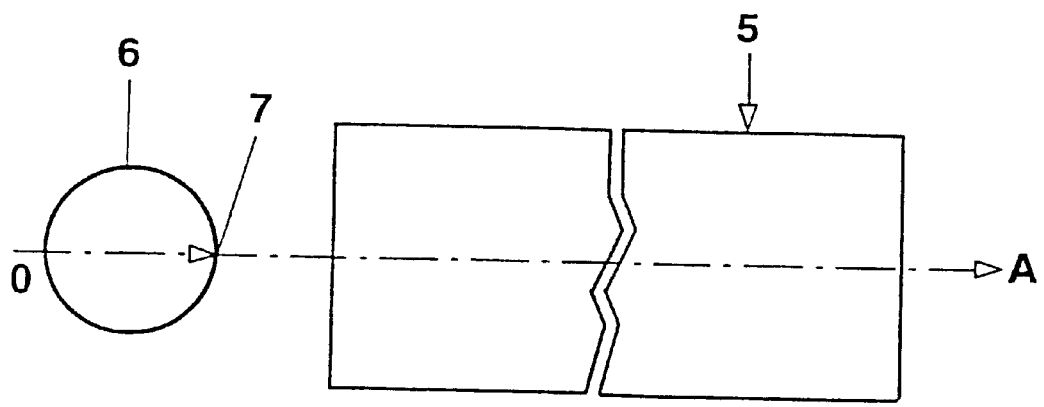
FIG. 2 shows a diagrammatic sectional illustration for explaining the prior art.
Figure 3:
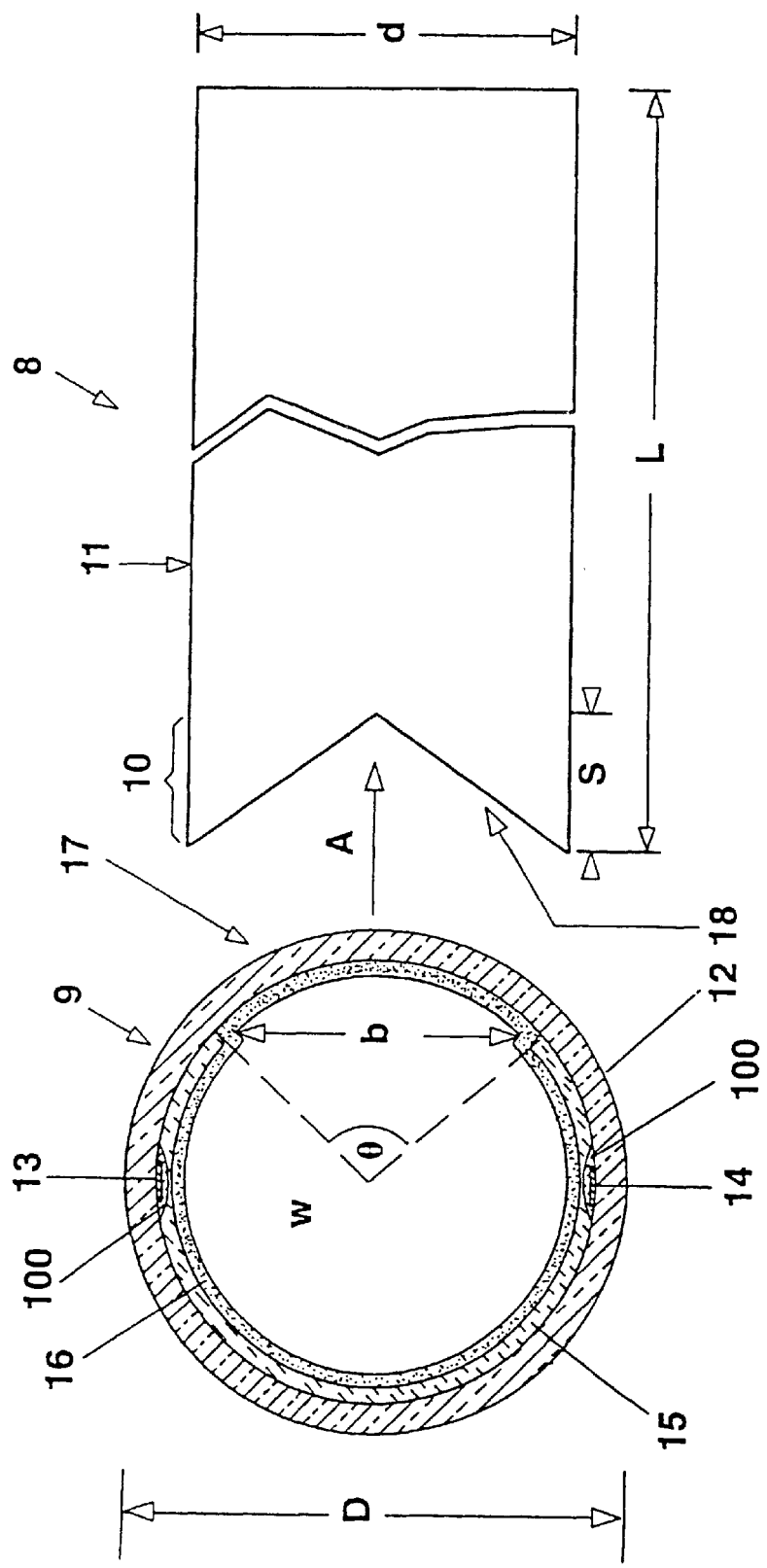
FIG. 3 shows a diagrammatic sectional representation of a lighting device according to the invention, having a light entrance surface with a V profile as a transmissive optical system.

FIG. 3 shows in a diagrammatic sectional illustration a flat lighting device 8 for backlighting liquid crystal displays (not illustrated), comprising an aperture fluorescent lamp 9, a optical system 10 and an optical conductor plate 11.

The fluorescent lamp 9 comprises a tubular discharge vessel 12, two electrodes 13, 14 and a functional layer system. The layer system comprises a reflecting layer 15 made from $TiO_2$, and a fluorescent layer 16 made from a three-band fluorescent material. The three-band fluorescent material consists of a mixture of the blue component of $BaMgAl_{10}O_{17}$:Eu, the green component of $LaPO_4$:Ce,Tb and the red component of $(Y,Gd)BO_3$:Eu. The resulting colour coordinates are x=0.395 and y=0.383, that is to say white light is produced. The reflecting layer 15 is applied directly to the inner wall of the discharge vessel 12, an aperture 17 of width b=8 mm being recessed. The fluorescent layer 16 is applied to the reflecting layer 15 or, in the region of the aperture 17, directly to the inner wall of the discharge vessel 12. The outside diameter D of the discharge vessel 12, consisting of glass, is approximately 14 mm in conjunction with a wall thickness of approximately 0.5 mm. The quotient b/D mentioned at the beginning as a measure of the useful luminous flux of an aperture lamp is therefore in this case approximately 0.57. Converted to the wall thickness, this corresponds to an actual aperture angle θ referred to the centre of the circular cross section of the vessel of approximately 80°. The length of the tubular discharge vessel 12, which is sealed in a gastight fashion at both its ends with a dome formed from the vessel material (not illustrated) is approximately 27 cm. Xenon with a filling pressure of approximately 17 kPa is located inside the discharge vessel 12. The two electrodes 13, 14 are constructed as metal strips, which are arranged diametrically relative to one another on the inner wall of the discharge vessel 12 parallel to the tube longitudinal axis. In this way, the maximum possible striking distance W of approximately 13 mm (=outside diameter minus double the wall thickness) in the case of a tubular discharge vessel is utilized for the discharge and, consequently, as explained at the beginning, a correspondingly high luminous flux of the lamp is achieved. Both electrodes 13, 14 are covered with a dielectric layer 100 made from glass solder.

The optical conductor plate 11 comprises a flat perspex parallelepiped of thickness d=10 mm, width B=27 cm in the direction of the lamp longitudinal axis and length L=20 cm perpendicular to the lamp longitudinal axis. One of the four narrow sides of the optical conductor plate 11 is an entrance edge 18 arranged parallel to the longitudinal axis of the fluorescent lamp 9 and opposite its aperture 17. Moreover, the fluorescent lamp 9 and the optical conductor plate 11 are arranged, viewed in the sectional illustration, centrally with respect to one another, that is to say on both sides of an imaginary centre line or optical axis A the width b of the aperture 17 is only respectively approximately 1 mm smaller than the thickness d of the optical conductor plate 4 (d/2−b/2=1 mm). The width b of the aperture is therefore approximately equal to the thickness d of the optical conductor plate.

Figure 4:
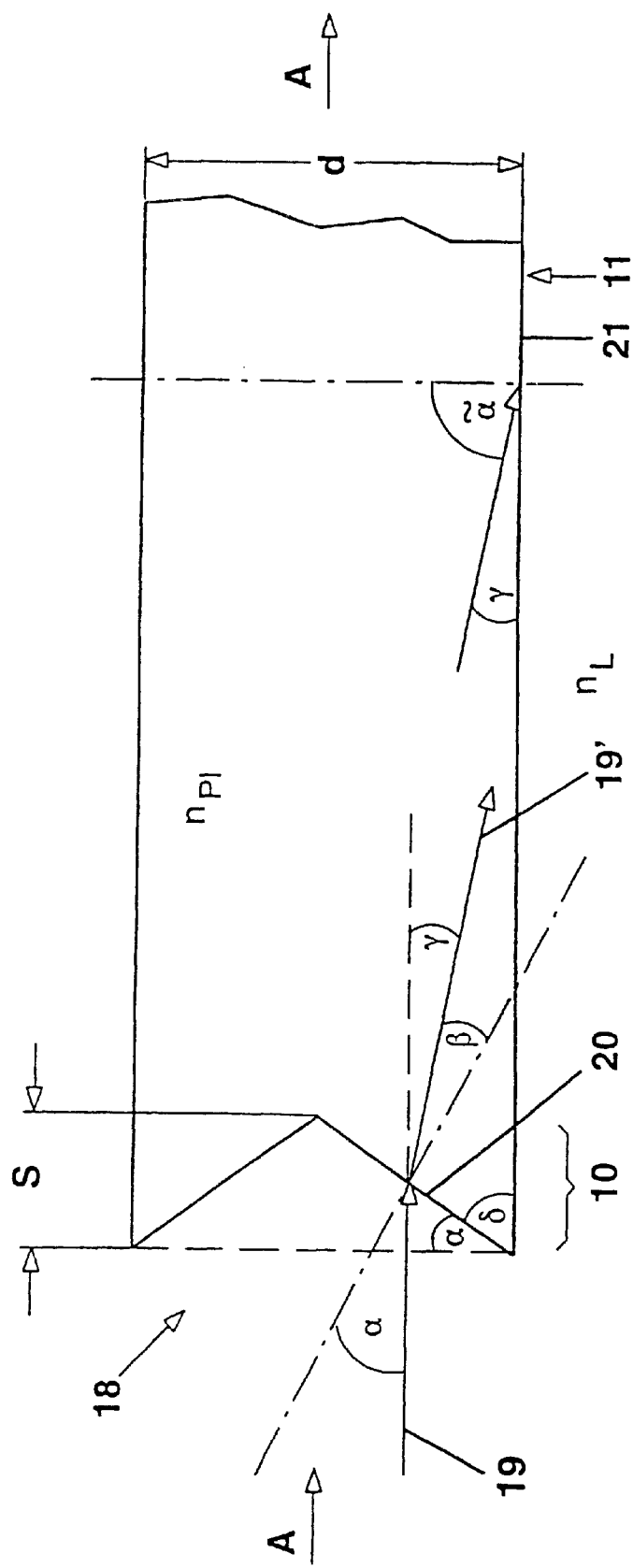
FIG. 4 shows a diagrammatic sectional illustration of the optical conductor plate having a light entrance surface with a V profile, in detail.

The optical system 10 is integrated in the region of the entrance edge 18 of the optical conductor plate 11. It comprises a notch of V-shaped cross section, which extends over the entire length of the entrance edge 18. Reference is made to FIG. 4 and the associated description for the details of the optical system 10 and its mode of operation.

In a variant which is not illustrated, a cylinder lens is arranged directly upstream of the entrance edge, in order to keep the coupling losses as low as possible.

Shown once more in detail in a side view in FIG. 4 is the optical conductor plate 11 from FIG. 3 with the optical system 10 and with a few parameters important for explaining the dimensioning according to the invention. Drawn in by way of example is a light beam 19 which is incident parallel to the optical axis A and strikes the lower bevel 20 of the V-shaped notch of the optical system 10 of the optical conductor plate 11 at an angle $\alpha$ to the vertical. The beam 19 is refracted towards the vertical upon entering the optical conductor plate 11. In the plate, the beam 19' forms the angle $\beta$ to the vertical, corresponding to an angular deviation $\gamma$ relative to the beam 19, and strikes the base surface 21 of the optical conductor plate 11 at the angle of $\alpha=90°-\gamma$ to the vertical. The requirement for total reflection is met for all beams for which it holds that $\alpha > \alpha_g$, $\alpha_g$ being the material-dependent critical angle of total reflection. For example, a depth of s=2 mm suffices for the notch for a perspex plate of thickness d=10 mm.

Figure 5:
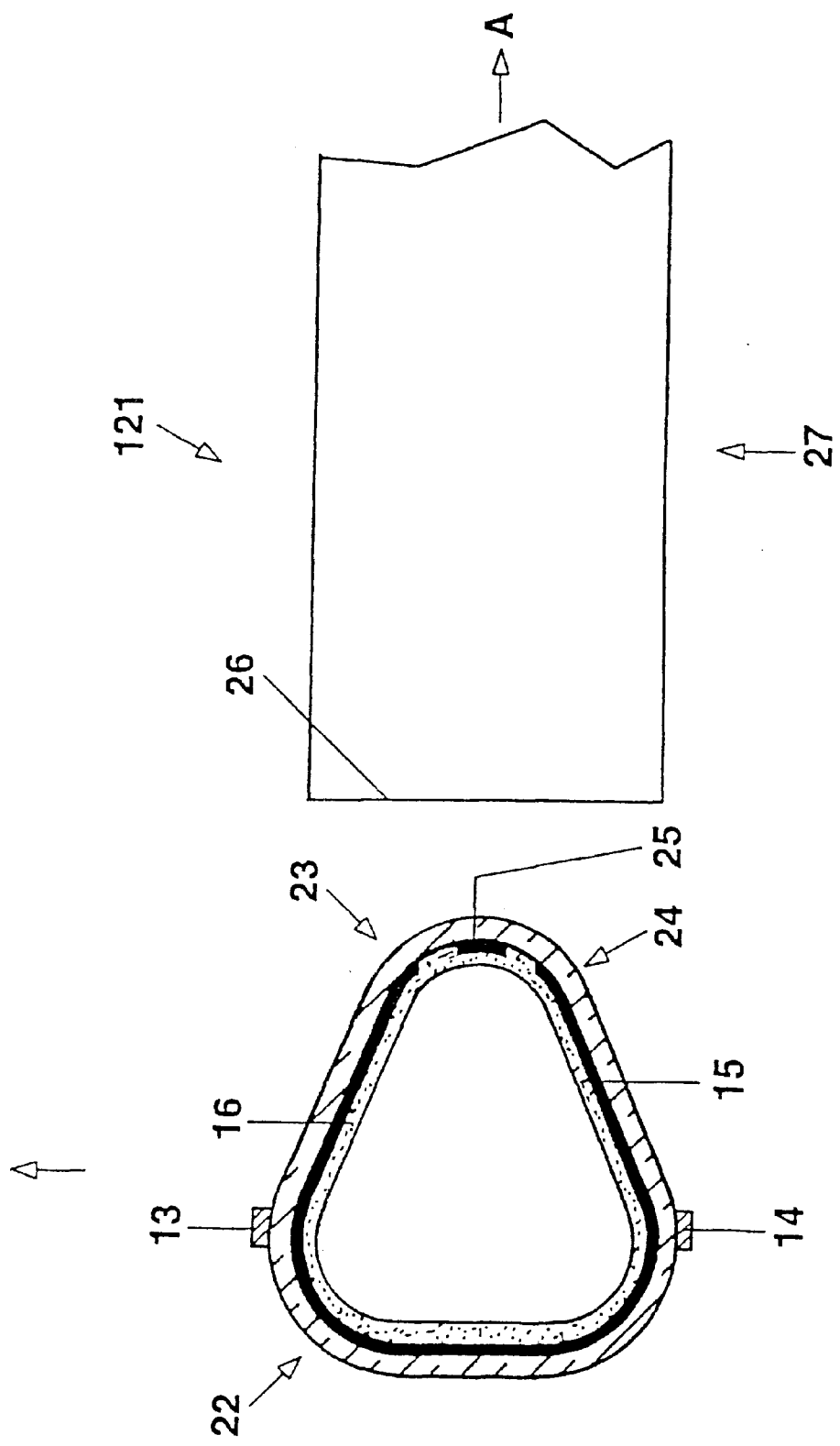
FIG. 5 shows a diagrammatic sectional illustration of a lighting device according to the invention with a bipartite aperture, as a transmissive optical system.

FIG. 5 shows a diagrammatic sectional representation of a further example of a flat lighting device 121 having a transmissive optical system. Features identical to those in FIG. 3 are provided with the same reference numerals. Here, the optical system is integrated into the aperture lamp 22 and comprises a bipartite aperture with the two partial apertures 23, 24 which are arranged on both sides of the optical axis A and are separated from one another by a reflecting layer strip 25. The two apertures 23, 24 produce a light distribution with two maxima, in each case at the desired angular spacing ,$\beta_1$ and $\beta_2$ from the optical axis A, in accordance with the angular relationship mentioned in the general part of the description. The tubular discharge vessel has a drop-like cross section as a supporting measure for splitting up the light distribution into two maxima. The reflecting layer strip 25 separating the two partial apertures 23, 24 is arranged at the point with the tightest wall curvature. The respective angular spacing between the maxima is thereby greater than in the case of a tube with a comparable cross-sectional area but a circular cross section. The two electrodes strips 13, 14 are arranged on the outer wall in such a way that they are opposite one another at a maximum striking distance. The light coming from the two partial apertures 23, 24 is coupled directly into the optical conductor plate 27 via the entrance edge 26 thereof.

Figure 6:
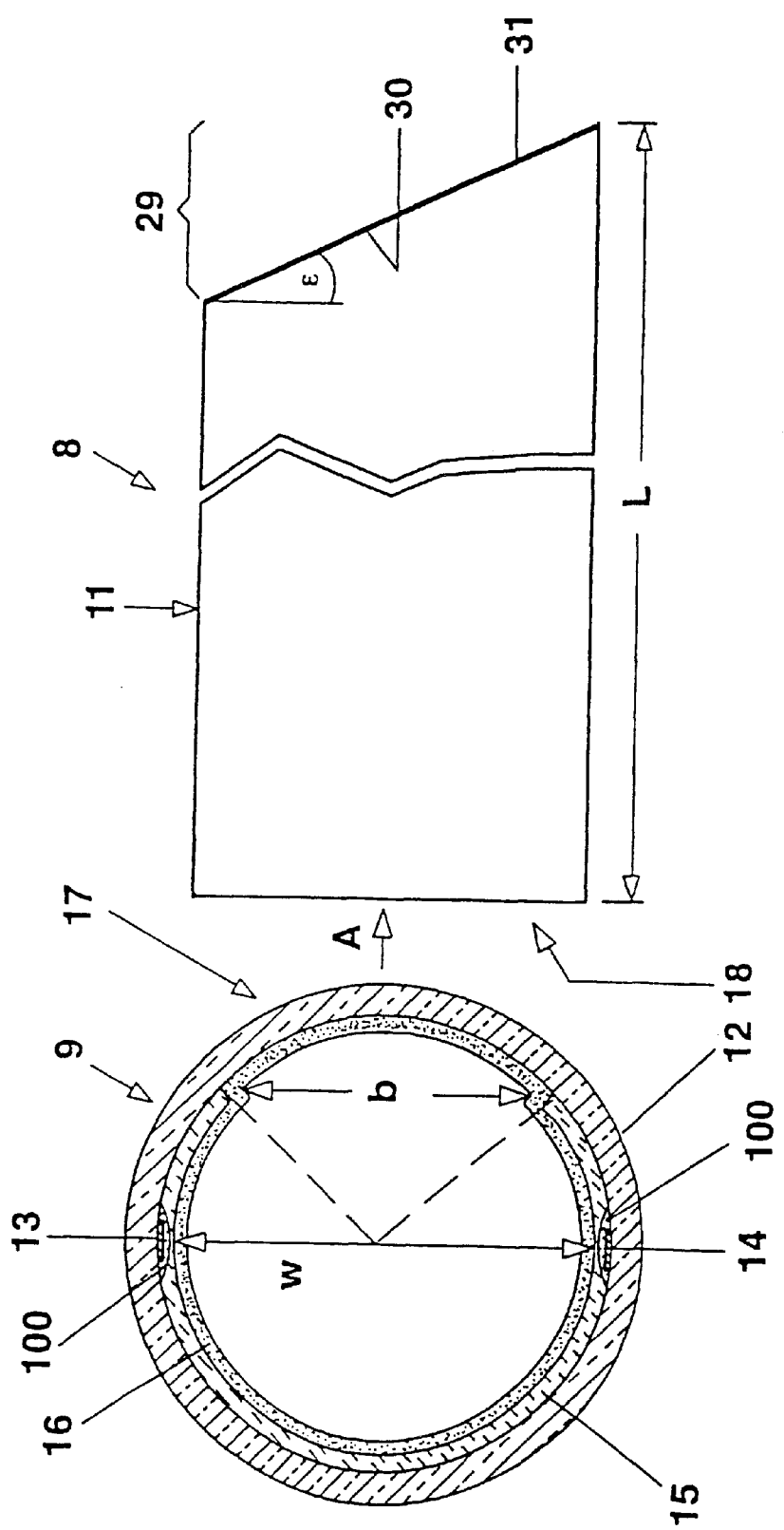
FIG. 6 shows a diagrammatic sectional representation of a lighting device according to the invention, with a reflective optical system.

Finally, FIG. 6 shows a diagrammatic sectional illustration of an example of a flat lighting device 28 having a reflective optical system. Features identical to those in FIG. 3 are again provided with the same reference numerals. The optical system 29 is integrated in the region of the narrow side of the optical conductor plate 11 remote from the lamp. It comprises a bevel 30, which extends over the entire length of the narrow side. The surface of the bevel 30 is provided with a layer 31 which reflects the lamp light. Suitable bevels are those whose tilting angles e relative to the vertical to the base side of the optical conductor plate 11 satisfy the following relationship:

$$\varepsilon < 45° - \frac{\alpha_G}{2}, \quad (2)$$

$\alpha_G$ denoting the material-dependent angle of total reflection.

Figure 7:
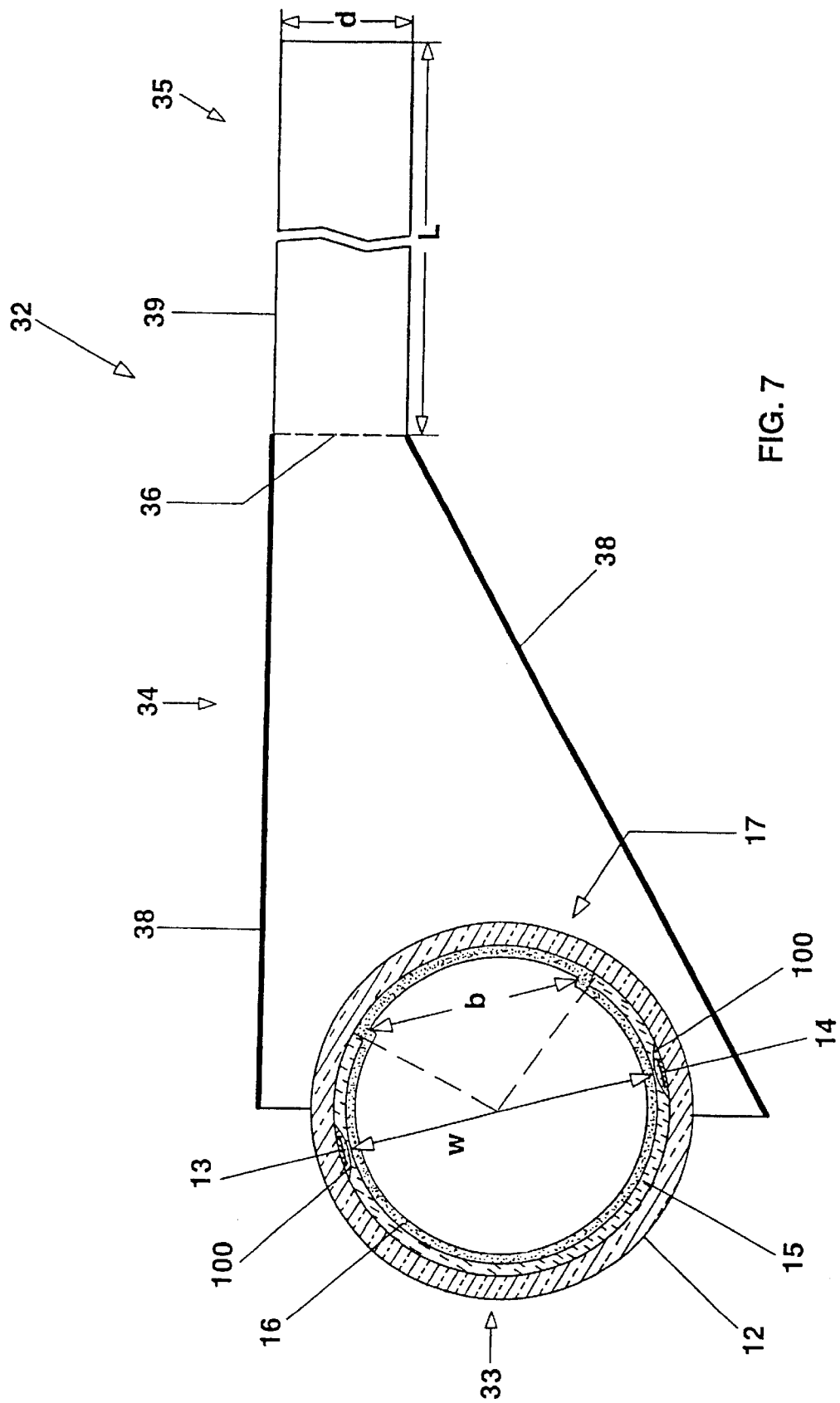
FIG. 7 shows a diagrammatic sectional illustration of a lighting device according to the invention, having an aperture lamp arranged below the optical conductor plate, and having a coupling element.

FIG. 7 shows in a diagrammatic sectional illustration a variant of a flat lighting device 32 for backlighting liquid crystal displays (not illustrated), comprising an aperture fluorescent lamp 33, a transmissive coupling element 34 and an optical conductor plate 35.

The fluorescent lamp 33 comprises a tubular discharge vessel 12, two electrodes 13, 14 and a functional layer system. The layer system comprises a reflecting layer 15 made from $TiO_2$, and a fluorescent layer 16 made from a three band fluorescent material. The three-band fluorescent material consists of a mixture of the blue component of $BaMgAl_{10}O_{17}$:Eu, the green component of $LaPO_4$:Ce,Tb and the red component of $(Y,Gd)BO_3$:Eu. The resulting colour coordinates are x=0.395 and y=0.383, that is to say white light is produced. The reflecting layer 15 is applied directly to the inner wall of the discharge vessel 12, an aperture 17 of width b=6 mm being recessed. The fluorescent layer 16 is applied to the reflecting layer 15 or, in the region of the aperture 17, directly to the inner wall of the discharge vessel 12. The outside diameter D of the discharge vessel 12, consisting of glass, is approximately 12 mm in conjunction with a wall thickness of approximately 1 mm. The length of the tubular discharge vessel 12, which is sealed in a gastight fashion at both its ends with a dome formed from the vessel material (not illustrated) is approximately 27 cm. Xenon with a filling pressure of approximately 17 kPa is located inside the discharge vessel 12.

The two electrodes 13, 14 are constructed as metal strips, which are arranged diametrically relative to one another on the inner wall of the discharge vessel 12 parallel to the tube longitudinal axis. In this way, the maximum possible striking distance W in the case of a tubular discharge vessel is utilized for the discharge and, consequently, as explained at the beginning, a correspondingly high luminous flux of the lamp is achieved. Both electrodes 13, 14 are covered with a dielectric layer 100 made from glass solder as well as the reflecting layer 15 and fluorescent layer 16.

The optical conductor plate 35 comprises a flat perspex parallelepiped of thickness d=4 mm, width B=27 cm in the direction of the lamp longitudinal axis and length L=20 cm perpendicular to the lamp longitudinal axis. The optical conductor plate 35 is orientated such that one of its narrow sides, the light entrance edge 36 is orientated parallel to the longitudinal axis of the lamp 33.

The coupling element 34 extends along and between the lamp 33 as well as the light entrance edge 36 of the optical conductor plate 35. Moreover, the coupling element 34 embraces the aperture 17 in the lamp 33. In other words, viewed in the plane of the drawing of FIG. 7, that is to say in a planar section perpendicular to the lamp longitudinal axis, the coupling element 34 tapers from more than the width b of the lamp aperture at its end on the lamp side to the thickness of the optical conductor plate 35 at the light entrance edge 36 at its opposite end. The coupling element 34 likewise consists of perspex, and is integrally formed on the optical conductor plate 35, that is to say the optical conductor plate 35 and coupling element 34 are in one piece. This has the advantage that there is no need to accept between the coupling element 34 and optical conductor plate 35 an interface which could lead to undesired losses. A half of the lamp 33 is embedded in the coupling element 34 in such a way that the aperture 17 is arranged entirely inside the coupling element 34.

In a variant not illustrated, the lamp is arranged completely inside the coupling element. For this purpose, the coupling element has a longitudinal bore whose diameter corresponds approximately to the outer diameter of the lamp. The lamp is arranged in this longitudinal bore.

Figure 8:
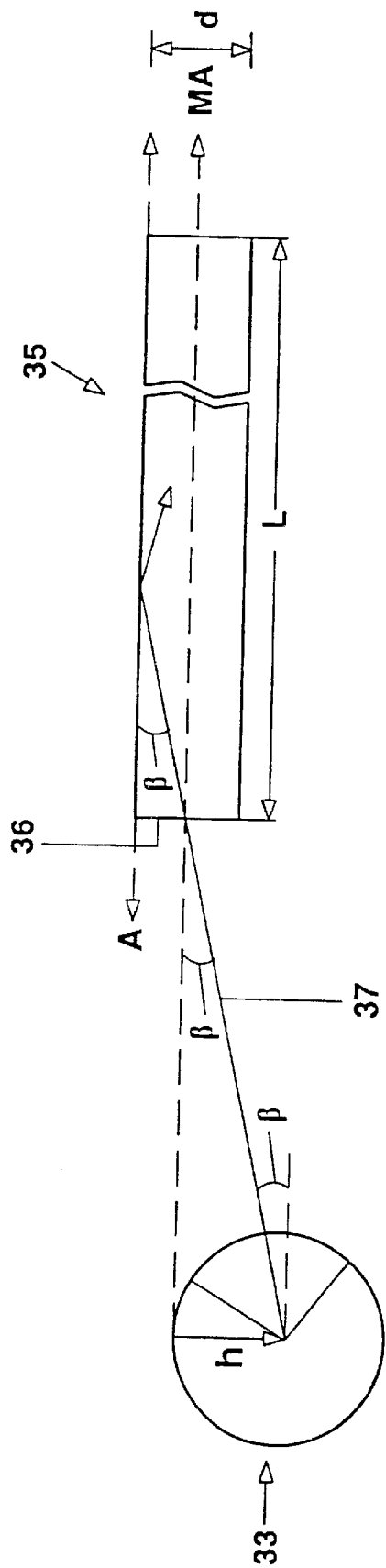
FIG. 8 shows a diagrammatic illustration of the principle for explaining the arrangement of the aperture lamp with reference to the optical conductor plate in accordance with FIG. 7 (without coupling element).

The lamp 33 is rotated about its longitudinal axis by an angle of β in such a way that the aperture 17 is orientated in the direction of the light entrance edge 36 (here and below reference is also made to FIG. 8, which illustrates the state of affairs in a very diagrammatic fashion). This angle β ensures that the angular spacing of the maximum of the light distribution of the lamp satisfies the relationship (1) in the description. In particular, for this purpose the lamp 33 is arranged at a spacing h below the central axis MA of the optical conductor plate 35 in such a way that the centre point beam 37 of the lamp 33 approximately strikes the middle of the light entrance edge 36 at the angle β.

Furthermore, the coupling element 34 is provided in each case on its outer surfaces with a reflecting layer 38. The reflecting layers 38 serve a purpose of also directing those "edge beams" which do not strike the light entrance edge 36 of the optical conductor plate 35 directly, at least indirectly—by means of reflection at just these layers 38—onto the light entrance edge 36, and therefore of raising the efficiency of the lighting device 32.

In a variant which is not illustrated, the coupling element is formed by means of reflecting surfaces, for example a reflecting film.

The light thus coupled into the optical conductor plate 35 leaves the latter in the way known per se in the essentially uniform fashion through its front side 39 and serves in this way as a flat light source of high luminous density for backlighting an LCD screen (not illustrated).

The invention is not restricted to the aforenamed examples. In particular, the features disclosed here can also be essential to the invention in other combinations. Furthermore, it also accords with the invention to combine further optical elements for example cylinder lenses for reducing the coupling losses into the optical conductor plate with the measures named in the examples.

Although, for the sake of sake of simplicity, the invention has been explained with the aid of a tubular aperture lamp, the lamps suitable for the lighting device according to the invention can also be angled, for example L-shaped or U-shaped, the light from the lamp then being coupled in the optical conductor plate via two or three edges. In this case, the luminous density which can be achieved on the front side of the optical conductor plate is even increased. Moreover, the lighting device can also have more than one such lamp, for example two, three or four, each of the lamps coupling light by means of an associated optical system into one of the light entrance surfaces of the optical conductor plate.

What is claimed is:

1. Flat lighting device (8, 32) having
    a discharge lamp (9, 33) with
        a tubular discharge vessel (12) with an outside diameter D, which discharge vessel (12) defines a lamp longitudinal axis and contains an ionizable filling in its interior,
        a fluorescent layer (16) which covers a wall of the discharge vessel at least partially,
        a number of electrodes (13, 14),
        an aperture (17) through which light passes during operation of the lamp (9),
    an optical system (10; 29; 34) for spatially redistributing the light emitted by the fluorescent layer (16) of the discharge lamp (9, 33),
    an optical conductor plate (11; 35) of thickness d with
        a first narrow side (18; 36) facing the lamp (9; 33), and a second narrow side averted from the lamp, and
        a front side (39),
    an optical axis (A) lying in the plane of the front side (39) and forming a right angle with the lamp longitudinal axis, and the light from the lamp (9; 33) passing through the first narrow side (18; 36) into the optical conductor plate (11; 35), and through the front side (39) out of the optical conductor plate (11; 35),
    the optical system (10; 29; 34) influencing the spatial light distribution of the light which is to be, or has been coupled into the optical conductor plate (11; 35) in such a way that, seen in a cross-sectional plane of the lamp, the light distribution has at least one maximum at an angular spacing β, measured relative to the optical axis (A), the angular spacing β fulfilling the following relationship:

$$|\beta| \geq \arctan\left(\frac{d}{L}\right), \qquad (1)$$

L being the longitudinal extent of the optical conductor plate (11; 35) in the direction of the optical axis (A).

2. Lighting device according to claim 1, in which the number of the maxima is two and the maxima are on opposite sides of the optical axis (A) at an angular spacing of $\beta_1$ and $\beta_2$, the relationship (1) being fulfilled for both angles.

3. Lighting device according to claim 2, in which $|\beta_1|=|\beta_2|$.

4. Lighting device according to claim 1 in which the optical system is integrated into the optical conductor plate (11) either in the region of the first narrow side (18), as a transmissive element (10) or in the region of the second narrow side, as a reflective element (29).

5. Lighting device according to claim 4, in which the optical system (29) comprises a narrow side of the optical conductor plate (11) having a bevel (30) with a tilt angle ε to a perpendicular to a base side which is opposite the front side of the optical conductor plate (11).

6. Lighting device according to claim 5, in which the relationship $$\varepsilon < 45° - \frac{\alpha_G}{2}$$

holds for the tilt angle ε, $\alpha_G$ denoting the material-dependent angle of total reflection.

7. Lighting device according to claim 4, in which the optical system comprises a V-shaped or parabolic cutout in a narrow side of the optical conductor plate.

8. Lighting device according to claim 5, in which the second narrow side is provided with a reflecting layer (31).

9. Lighting device according to claim 1, in which a ratio b/d of aperture width b to thickness d of the optical conductor plate is greater than or equal to 0.6.

10. Lighting device according claim 1 in which the optical system includes one or more of the following elements: cylinder lens, Fresnel film, prismatic film.

11. Lighting device according claim 1 in which the optical system comprises an optical coupling element (34) which extends at least in the space between the aperture (17) of the lamp (33) and the narrow side (36) of the optical conductor plate (35).

12. Lighting device according to claim 11, in which the optical coupling element (34) and the optical conductor plate (35) are of one piece.

13. Lighting device according claim 1 in which the optical system comprises a reflector (38) which surrounds at least the space between the aperture (17) and the first narrow side (36) of the optical conductor plate (35) in such a way that the light beams passing through the aperture (17) during operation are deflected in the direction of the narrow side (36).

14. Lighting device according to claim 1, in which the electrodes (13, 14) are arranged on the wall of the discharge vessel (12), at least a portion of the electrodes being separated from the interior of the discharge vessel (12) by a dielectric (100).

15. Lighting device according to claim 14, in which the number of the electrodes (13, 14) is two, the electrodes (13, 14) being strip-shaped and arranged parallel to the lamp longitudinal axis and diametrically at the maximum mutual spacing from one another.

16. Lighting device according to claim 15, in which
the optical system is formed by splitting the aperture into two elongated partial apertures (23, 24) arranged parallel to one another and separated from one another by a narrow web (25) parallel to the first narrow side (26) of the optical conductor plate, the tubular discharge vessel has a drop-like cross section, the web (25) separating the two partial apertures (23, 24) being arranged at the point of tightest wall curvature, and the two electrode strips (13, 14) are arranged on the wall of the discharge vessel opposite one another at maximum striking distance (W).

17. Lighting device according to claim 1, in which the outside diameter (D) of the tubular discharge vessel is equal to or greater than the 0.8-fold thickness (d) of the optical conductor plate.

18. Lighting device according to claim 1, in which the filling consists of an inert gas or a mixture of a plurality of inert gases.

19. Lighting device according to claim 1, in which a ratio b/d of aperture width b to thickness d of the optical conductor plate is greater than or equal to 0.8.

20. Lighting device according to claim 1, in which a ratio b/d of aperture width b to thickness d of the optical conductor plate is greater than or equal to 1.

* * * * *